(12) United States Patent
Liaw

(10) Patent No.: US 7,010,196 B2
(45) Date of Patent: Mar. 7, 2006

(54) METHOD OF FORMING LASER INDUCED GRATING PATTERN

(75) Inventor: Jiann-Shuoh Liaw, Hsinchu Industrial Park (TW)

(73) Assignee: RiTdisplay Corporation, Hsinchu (TW)

( * ) Notice: Subject to any disclaimer, the term of this patent is extended or adjusted under 35 U.S.C. 154(b) by 223 days.

(21) Appl. No.: 10/616,132

(22) Filed: Jul. 8, 2003

(65) Prior Publication Data
US 2004/0008940 A1    Jan. 15, 2004

(30) Foreign Application Priority Data
Jul. 10, 2002   (TW) ............................... 91115276 A

(51) Int. Cl.
*G02B 6/34* (2006.01)

(52) U.S. Cl. ...................................................... 385/37
(58) Field of Classification Search ................. 385/31, 385/37–39, 41; 356/521, 432, 345, 359, 356/360, 450
See application file for complete search history.

(56) References Cited

U.S. PATENT DOCUMENTS 6,118,533 A * 9/2000 Banet et al. ................ 356/450
6,795,198 B1 * 9/2004 Fuchs et al. ................ 356/521

\* cited by examiner

*Primary Examiner*—Akm Enayet Ullah
(74) *Attorney, Agent, or Firm*—J.C. Patents

(57) ABSTRACT

A method of forming a laser-induced grating comprising the steps of providing a substrate with a polished surface having a plurality of reflective regions thereon, providing a pulsed layer beam and focusing the beam on the substrate to produce a grating pattern on the substrate.

22 Claims, 5 Drawing Sheets

METHOD OF FORMING LASER INDUCED GRATING PATTERN

CROSS-REFERENCE TO RELATED APPLICATION

This application claims the priority benefit of Taiwan application serial no. 91115276, filed Jul. 10, 2002.

BACKGROUND OF THE INVENTION

1. Field of Invention

The present invention relates to a method of forming a laser induced grating pattern. More particularly, the present invention relates to the production of a laser induced grating pattern by providing a pulse laser, which is incident to an interference strain/displacement gage (ISDG).

2. Description of Related Art

With rapid progress in semiconductor production technology, integrated circuits continue to shrink and functional performance continues to improve. However, circuit miniaturization and performance improvement demands an increase in the level of integration. Because most integrated circuits are increasingly complicated, a multi-layer design is frequently required. In the fabrication of integrated circuits, processes including material deposition, photolithographic exposure, pattern etching and chemical-mechanical polishing are routinely deployed. Based on reliability consideration, thickness of thin films after a material deposition or a chemical-mechanical polishing operation is often measured. In general, a non-destructive measurement is preferred over other means of measuring the thickness of the film to ensure film integrity. The most common non-destructive method of measuring the thickness of a film includes providing two beams of laser which are incident at an angle to the film simultaneously.

One major aspect of film thickness measurement is the production of a laser induced grating pattern. In general, the profile, the degree of resolution between the bright and the dark pattern and the contrast (difference) in brightness between the bright and the dark pattern are principle factors that affect thickness measurement directly. Therefore, a variety of techniques for producing a laser induced grating pattern have been developed. The most common method for measuring the thickness of a film is still the application of two incident laser beams at an angle into one particular location on the film.

FIG. 1 is a perspective view showing two incident laser beams targeting a single spot on the surface of a film to produce a laser induced grating pattern together and associated film thickness measurement. As shown in FIG. 1, two pulsed laser beams 100a, 100b having an identical frequency (wavelength) aims at the same location on the thin film 102 at an angle of incident θ. Through the interference of the pulsed laser beams 100a, 100b, a grating pattern 104 (a laser induced grating pattern) is formed on the film 102. The grating pattern 104 generates a surface acoustic wave (SAW) 106 on the film 102 having a vibrating frequency in the megahertz (MHz) to the gigahertz (GHz) range. In fact, the surface acoustic wave 106 is a standing wave propagating parallel to the surface of the film 102.

The incident angle θ of the pulsed laser beams 100a, 100b largely determines the spacing between the bright and dark pattern as well as the wavelength of the surface acoustic wave 106 generated on the surface of the film 102. To facilitate thickness measurement of the film 102, the spacing of the bright and dark pattern and the wavelength of the surface acoustic wave 106 of the grating pattern 104 can be adjusted by changing the incident angle of the pulsed laser beams 100a, 100b.

After producing the surface acoustic wave 106 on the surface of the film 102, a probing laser beam 108a is provided on the film 102 to produce a diffracted laser beam 108b. Through the laser beam 108b, the frequency and the velocity of the surface acoustic wave 106 can be deduced. Because the frequency and propagating velocity of the surface acoustic wave 106 is affected by the thickness of the film 102, thickness of the film 102 can be deduced from the information gather from the laser beam 108b about the surface acoustic wave 106.

However, providing two pulsed laser beams which are incident on the surface of a film to generate a grating pattern typically entails the following problems:

1. The grating pattern has an elliptical profile with low resolution and contrast between bright and dark pattern. Hence, the conventional technique can hardly produce a narrow surface acoustic wave. Furthermore, the signal/noise (S/N) ratio is rather low and hence leads to a low resolution for the film measurement.
2. Adjusting the angle of incident of the two pulsed laser beams accurately and simultaneously is a difficult feat. If there is minor nonconformity between the two incident angles of the laser beams, the spacing between the bright and dark lines in the grating pattern or the wavelength of the surface acoustic wave on the film is difficult to decide. In some cases, not even the grating pattern will form leading to the impossibility of measuring the film thickness.
3. The two-laser-beam method can be applied to measure a metallic film with a thickness of more than several thousand angstrom (Å). Hence, the method is unsuitable for measuring a film any thinner.
4. Setting up the two-beam system in the production equipments along a production line to measure film thickness is rather difficult because the beams and the surface film must be positioned very accurately.

SUMMARY OF THE INVENTION

Accordingly, one object of the present invention is to provide a method of forming a laser induced grating such that the bright and dark lines within the grating has an enhanced contrast and a rectangular overall profile and the bright and dark lines has a more even distribution.

A second object of this invention is to provide a method of forming a laser induced grating such that a simple mechanism exists for changing the spacing between bright and dark lines in the grating.

A third object of this invention is to provide a method of measuring the thickness of a film capable of changing the wavelength of a surface acoustic wave rapidly and accurately and enhancing the contrast between the bright and dark lines within the grating at the same time.

A fourth object of this invention is to provide a method of measuring the thickness of a film capable of providing a surface acoustic wave signal having narrower bandwidth and hence increasing the signal/noise (S/N) ratio for securing a higher resolution in the thickness measurement.

To achieve these and other advantages and in accordance with the purpose of the invention, as embodied and broadly described herein, the invention provides a method of forming a laser induced grating pattern. First, a substrate with a polished surface having a plurality of reflective regions thereon is provided. A laser beam is aimed at the reflective regions on the substrate to form a grating pattern through optical interference. A cylindrical lens is used to adjust the spacing between the bright and dark grating lines on the surface of the film. The cylindrical lens is set up between the substrate and the film so that the spacing between the bright and the dark lines in the grating can be rapidly and accurately adjusted by shifting the position of the lens.

This invention also provides a method of measuring the thickness of a thin film. First, a substrate with a polished surface having a plurality of reflective regions thereon is provided. A laser beam is aimed at the reflective regions on the substrate to form a grating pattern through optical interference. A cylindrical lens is used to adjust the spacing between the bright and dark grating lines on the surface of the film. The cylindrical lens is set up between the substrate and the film so that the spacing between the bright and the dark lines in the grating can be rapidly and accurately adjusted by shifting the position of the lens. Thereafter, the surface acoustic wave on the surface of the thin film generated by the grating pattern is utilized to measure the thickness of the film.

The plurality of reflective regions on the substrate has at least a pair of parallel reflecting surfaces. Each reflective region is a multi-facial conical depression structure such as a depressed tetrahedral or octahedral structure, for example. The reflection regions are formed, for example, by impressing the substrate with a Vicker's micro-hardness tester or performing a semiconductor fabrication to shape the substrate. A protective layer (formed by a reinforced treatment) may also be formed on the surface of the substrate and various reflective regions. The protective layer is a dielectric layer, for example.

The cylindrical lens according to this invention has a light incident surface and a light-emitting surface. The light incident surface is a plane rectangular surface and the light-emitting surface is a convex surface. The grating pattern enters the light incident surface of the cylindrical lens and emerges from the light-emitting surface of the cylindrical lens. The spacing of the bright and dark lines in the grating pattern is easily modified through a shift in the position of the cylindrical lens. Furthermore, the grating pattern on the surface of the film after passing through the cylindrical lens has a more rectangular overall profile with a higher contrast and resolution between the bright and dark lines.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
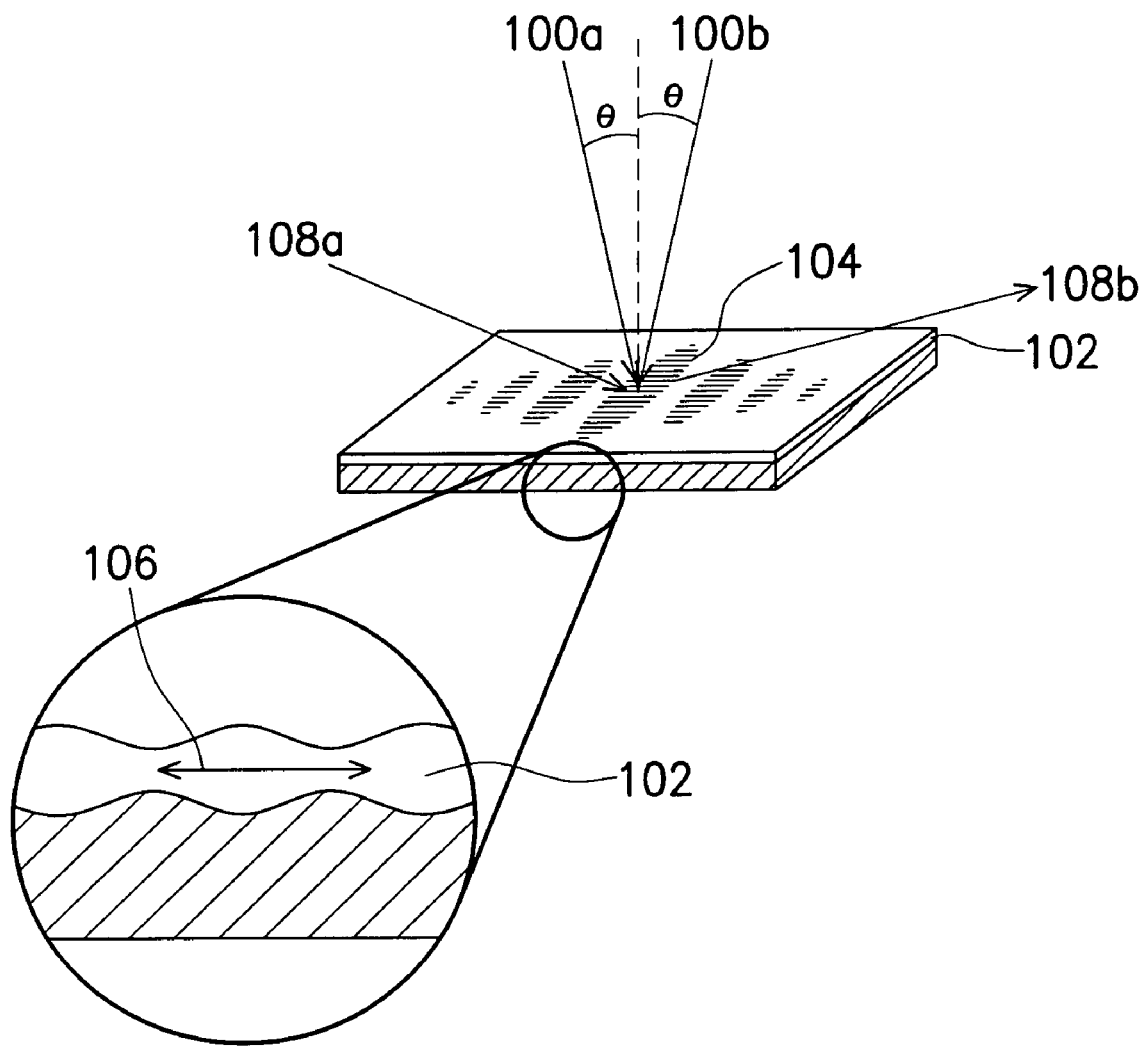
FIG. 1 is a perspective view showing two incident laser beams targeting a single spot on the surface of a film to produce a laser induced grating pattern together and associated film thickness measurement.

Reference will now be made in detail to the present preferred embodiments of the invention, examples of which are illustrated in the accompanying drawings. Wherever possible, the same reference numbers are used in the drawings and the description to refer to the same or like parts.

In this embodiment, the measurement of the thickness of a thin film is used as an illustration. Obviously, the method of forming the laser induced grating pattern is not limited to the thickness measurement of a thin film. In other words, the method of forming a laser induced grating pattern can be used inside a transient surface acoustic wave (SAW) device, one type of measuring sensor for material characterization or bio-chemical assay. Material characterization includes measuring the material properties of a thin film or the material properties of a fluidic compound. Bio-chemical assay includes applications such as mass loading, mechanical properties, rheological properties, electrical properties, thermal effects and so on.

One critical aspect in the method of measuring the thickness of a thin film is the generation of a grating pattern. The conventional two incident laser beam method of generation a grating pattern uses a simultaneous change of the incident angle to adjust the spacing between the bright and dark lines in the grating has a number of problems and little practical values. In this invention, a pulsed laser beam is provided to an interference strain/displacement gage instead of providing two incident laser beams which are incident directly to the surface of a film to produce a laser-induced grating pattern.

Figure 2:
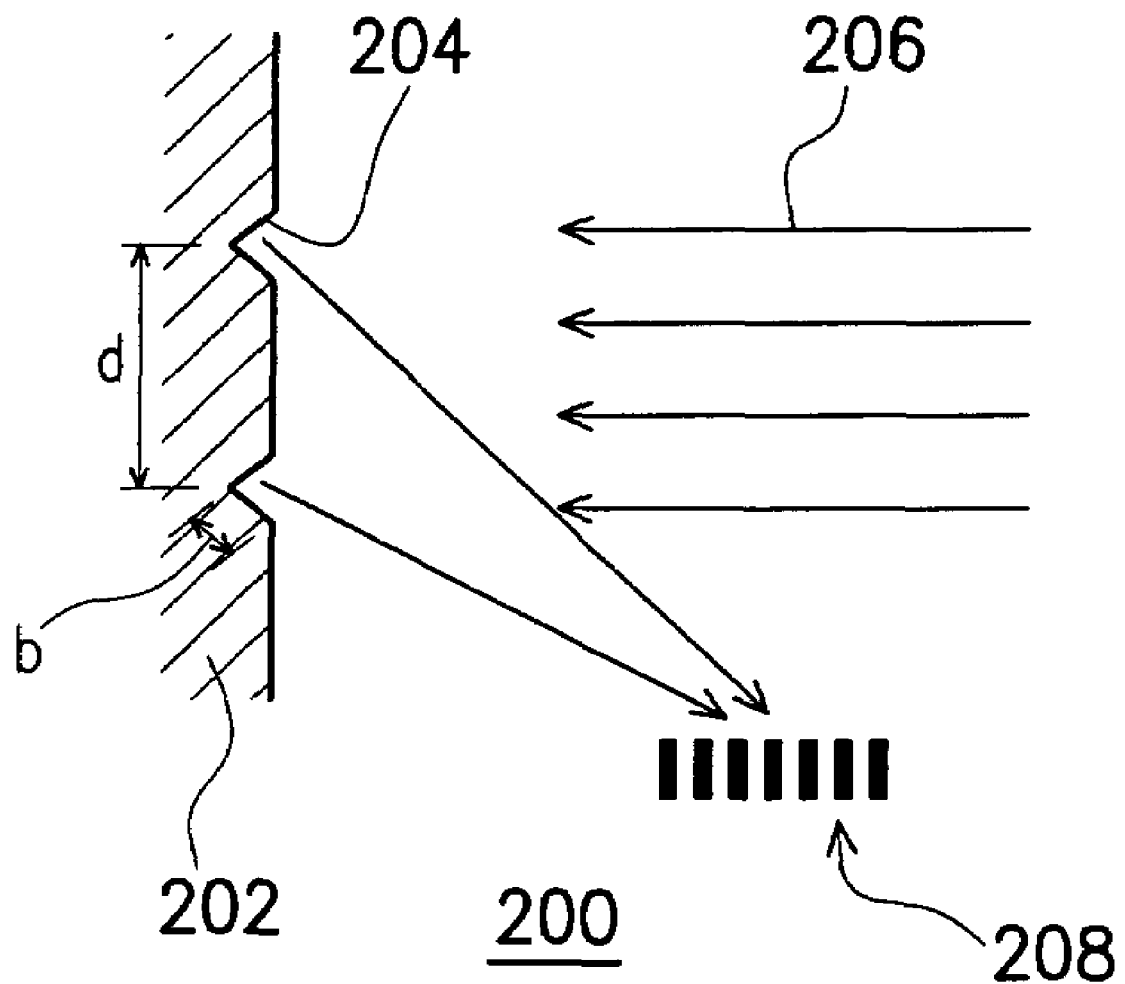
FIG. 2 is a diagram showing a continuous wavelength laser beam impinging on an interference strain/displacement gage to produce a laser induced grating pattern.

FIG. 2 is a diagram showing a continuous wavelength laser beam impinging on an interference strain/displacement gage to produce a laser induced grating pattern. A conventional interference strain/displacement gage 200 is generally used in various measurements including, for example, dynamic measurement, fatigue measurement or high-temperature measurement of a sample. Before conducting any measurements, two reflective regions 204 are formed on the surface of a specimen 202 using a Vicker's micro-hardness tester. Thereafter, the specimen 202 is set up and illuminated by a continuous wavelength laser beam 206. The two reflective regions 204 on the specimen 202 cause an interference of the incoming continuous wavelength laser beam 206 to produce a grating pattern at a specified angle.

Each reflective region 204 has a face dimension b of between 10 $\mu$m to 25 $\mu$m. In addition, the two reflective regions 204 are separated from each other by a distance d between a few tens to a few hundred micrometers and preferably about 50 $\mu$m.

Typically, the interference strain/displacement gage 200 is used for sample measurement including, for example, dynamic measurement, fatigue measurement or high-temperature measurement. In this embodiment, this method of generating a grating pattern is utilized with some improvements. This method of generating the grating pattern is further deployed for measuring film thickness or some other application areas. The measurement of film thickness is described in more detail below.

Figure 3:
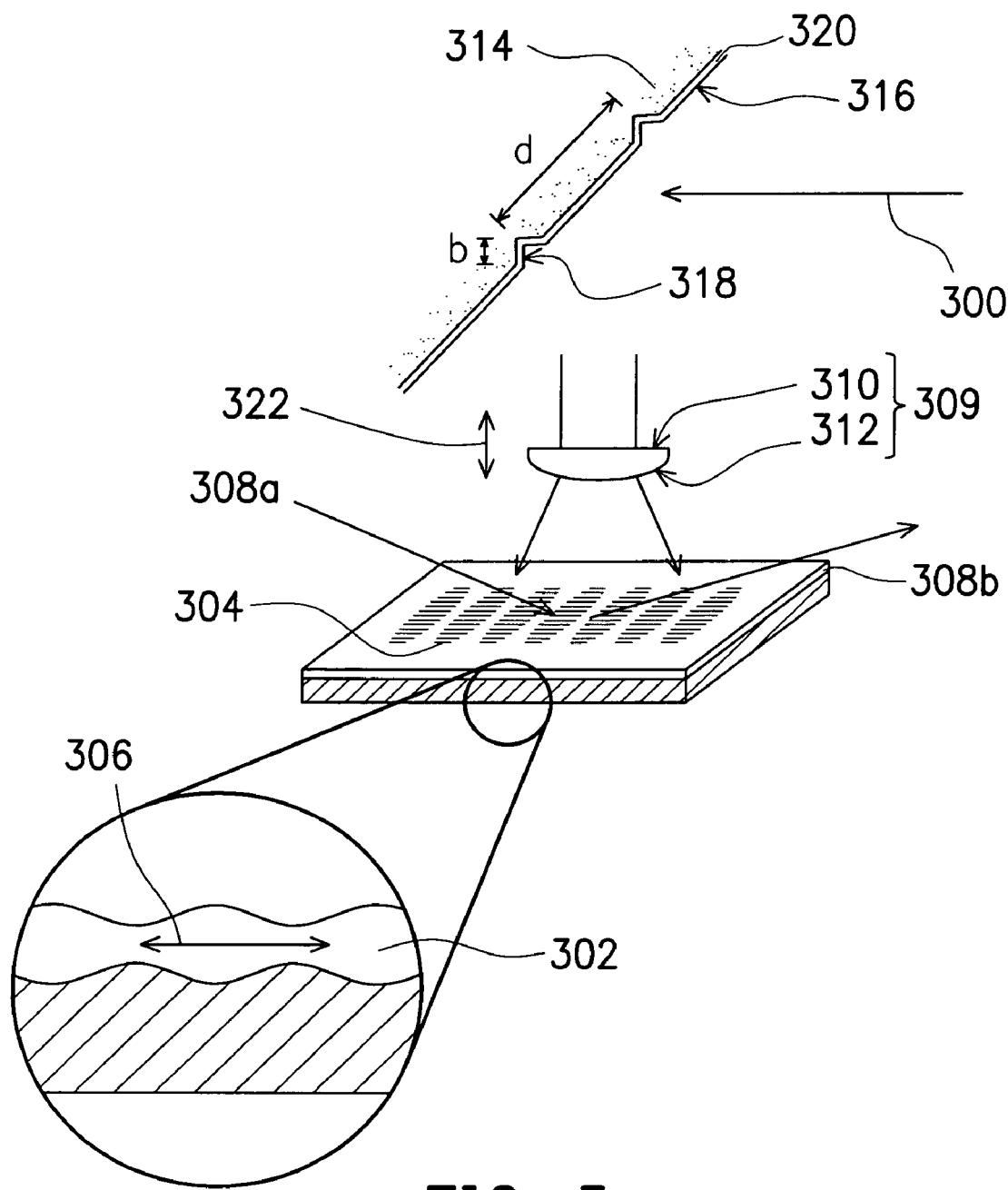
FIG. 3 is a diagram showing the method of measuring the thickness of a thin film according to one preferred embodiment of this invention.

FIG. 3 is a diagram showing the method of measuring the thickness of a thin film according to one preferred embodiment of this invention. As shown in FIG. 3, a substrate 314 having a polished surface 316 is provided. The polished surface 316 prevents an incoming pulsed laser beam 300 from dispersion. Furthermore, the polished surface 316 has a plurality of reflective regions 318 for generating a grating pattern 304. The reflective regions 318 on the substrate 314 are tetrahedral depressions, for example. A protective layer 320 is also formed on the surface of the substrate 314 and the reflective regions 318. The protective layer 320 prevents the pulsed laser beam 300 from damaging the substrate 314. Each reflective region 318 has a surface dimension b between 10 µm to 25 µm, for example. The two reflective regions 318 are separated from each other by a distance d ranging from several tens to a hundred micrometers, preferable about 50 micrometer.

Thereafter, the pulsed laser beam 300 is focused on the substrate 314 such that the pulsed laser beam 300 falling on the reflective regions 318 interferes with each other to form a grating pattern 304. The grating pattern 304 passes through a cylindrical lens 309 and then illuminates the surface of the film 302. Through a shift in the position of the cylindrical lens 309, the spacing between the bright and dark lines of the grating pattern on the surface of the thin film 302 can be varied.

In this embodiment, the cylindrical lens 309 has an incident light surface 310 and a light-emitting surface 312. The incident light surface 310 is a plane rectangular surface and the light-emitting surface 312 is a convex surface. The grating pattern 304 enters the cylindrical lens 309 from the incident light surface 310 and emerges from the cylindrical lens 309 through the light-emitting surface 312. After passing through the cylindrical lens 309, the spacing between the bright and dark line of the grating pattern 304 is changed.

The cylindrical lens 309 is set up between the substrate 314 and the film 302. The cylindrical lens 309 is permitted to move in the direction 322 so that the spacing between the bright and dark lines in the grating pattern 304 can be rapidly and accurately adjusted. In general, the cylindrical lens 309 moves in a direction perpendicular to the surface of the film 302. After moving the lens 309 to a suitable location, the surface acoustic wave 306 on the surface of the film 302 resulting from the grating pattern 304 is used to measure the thickness of the film 302.

Anyone familiar with laser technologies may notice that the surface acoustic wave 306 on the surface of the film 302 contains information for deducing the thickness of the film 302. The method includes providing a detection laser beam 308a, which is incident on the film 302 at an angle at the film surface, and then collecting the diffracted laser beam 308b. From the diffracted laser beam 308b, the frequency and velocity of the surface acoustic wave 306 can be deduced. Because the frequency and velocity of the surface acoustic wave 306 generated on the film 302 is related to the thickness of the film 302, the thickness of the film 302 can be found after sensing the diffracted laser beam 308b.

Although the aforementioned substrate 314 also relies on a suitable spacing between the reflective regions 318 to generate the grating pattern, the grating pattern is actually produced by a combination of the interference strain/displacement gage (ISDG) with the cylindrical lens 309. Hence, by adjusting the position of the lens, the spacing of the bright and dark lines within the laser-induced grating pattern (the grating pattern 304) are set accurately.

Figure 4:
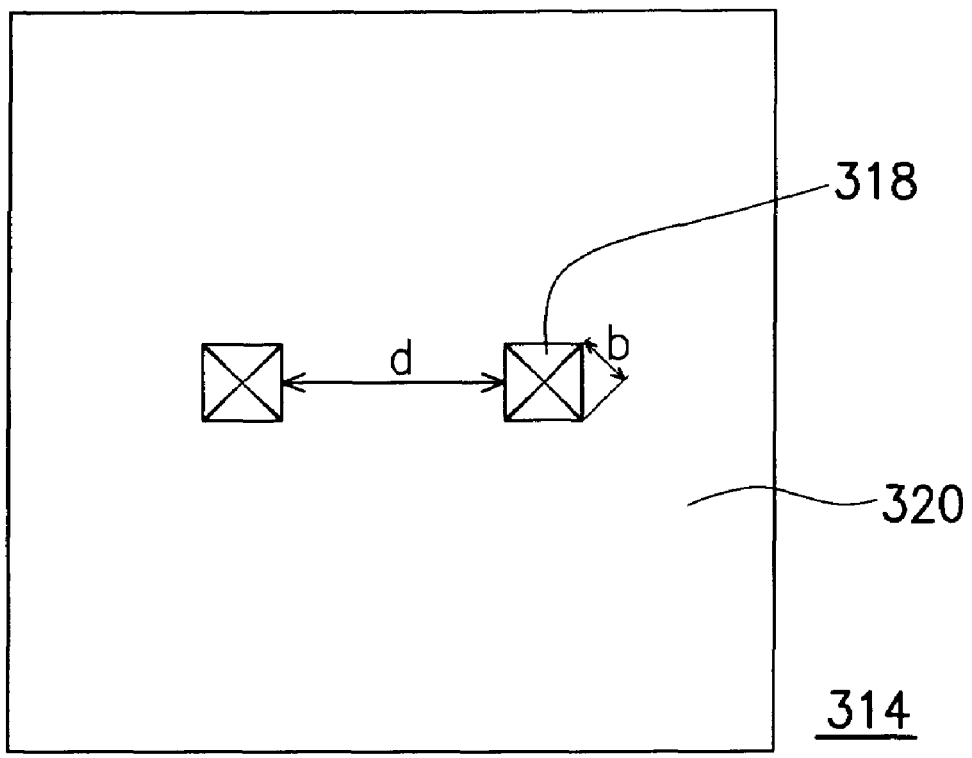
FIG. 4 is a top view showing the reflective regions on a substrate according to one preferred embodiment of this invention.

FIG. 4 is a top view showing the reflective regions on a substrate according to one preferred embodiment of this invention. As shown in FIG. 4, the reflective regions 318 on the substrate 314 has a lateral surface dimension b between 10 µm to 25 µm. The two reflective regions 318 are separated from each other by a distance d between several tens to over a hundred micrometers, preferably about 50 micrometers. In addition, a protective layer 320 is also formed over the surface of the substrate 314 and the reflective regions 318. The protective layer 320 is fabricated using a dielectric material, for example. With the protective layer 320 covering the substrate 314, damage to the substrate 314 when subjected to a pulsed laser beam (not shown) is minimized.

Furthermore, the plurality of reflective regions 318 on the substrate 314 has at least pair of reflective surfaces parallel to each other. Each reflective region 318 is a multi-facial conical depression such as a tetrahedral or an octahedral depression, for example. The reflective regions 318 are formed, for example, by imprinting the substrate 314 with a Vicker's micro-hardness tester or performing a series of semiconductor processes to shape the surface of the substrate 314.

Figure 5:
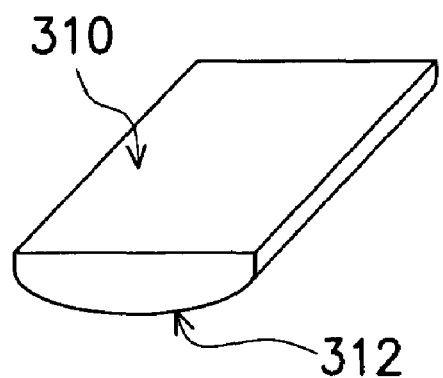
FIG. 5 is a perspective view of a cylindrical lens according to one preferred embodiment of this invention.

FIG. 5 is a perspective view of a cylindrical lens according to one preferred embodiment of this invention. As shown in FIG. 5, the cylindrical lens 309 has an incident light surface 310 and a light-emitting surface 312. The incident light surface 310 is a plane rectangular surface and the light-emitting surface 312 is a convex surface. The grating pattern 304 enters the cylindrical lens 309 through the incident light surface 310 and emerges from the cylindrical lens 309 through the light-emitting surface 312. In general, the spacing of the bright and dark lines within the grating pattern 304 is easily adjusted by changing the position of the lens 309 slightly.

Figure 6:
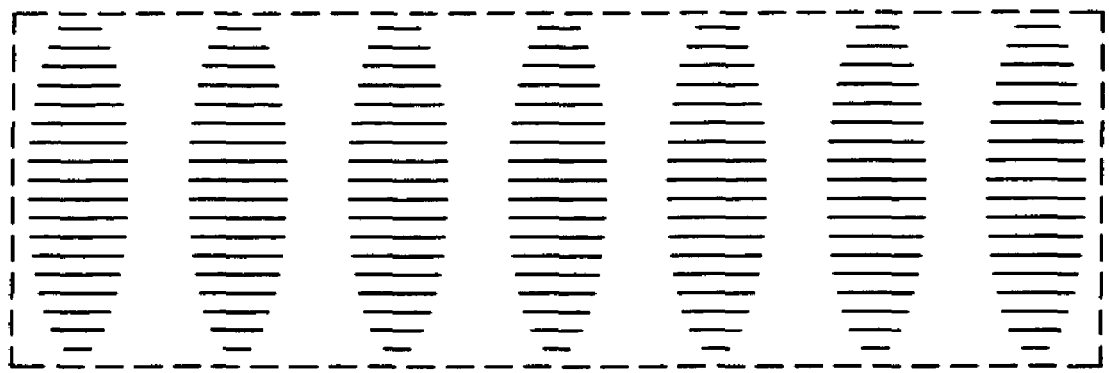
FIG. 6 is a top view showing a grating pattern illuminating the surface of a thin film according to one preferred embodiment of this invention.

FIG. 6 is a top view showing a grating pattern illuminating the surface of a thin film according to one preferred embodiment of this invention. As shown in FIG. 6, the grating pattern after passing through the cylindrical lens has a more rectangular overall profile, a more uniform bright and dark line distribution, a better bright and dark line contrast and a higher resolution. Hence, this invention provides a surface acoustic wave signal having a narrower frequency bandwidth and a higher signal/noise (S/N) ratio to facilitate film thickness measurement.

In summary, the method for measuring the thickness of a thin film has at least the following advantages:

1. The grating pattern is easier to produce and control and the contrast between the bright and dark lines within the grating pattern is higher so that the thickness measurement can have a higher resolution.
2. The spacing between the bright and dark lines within the grating pattern can be varied through an adjustment of the cylindrical lens position. Therefore, a simple mechanism is provided to vary the spacing between the bright and dark lines within the grating pattern.
3. The grating pattern has a more rectangular overall profile and the bright and dark lines within grating are more uniformly distributed after the passage through the cylindrical lens.
4. The method of this invention provided a surface acoustic wave having a narrower frequency bandwidth and a higher signal/noise ratio so that the film thickness measurement can have a higher resolution.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of forming laser-induced grating pattern, comprising the steps of:
   providing a substrate with a polished surface having a plurality of reflective regions thereon;
   providing a pulsed laser beam that shines on the reflective regions on the substrate to produce a grating pattern through optical interference; and
   providing a cylindrical lens for adjusting the configuration of the grating pattern.

2. The method of claim 1, wherein the reflective regions on the substrate are formed by performing a series of imprinting operations using a Vicker's micro-hardness tester.

3. The method of claim 1, wherein the reflective regions on the substrate are formed by performing a series of semiconductor processes to shape the surface of the substrate.

4. The method of claim 1, wherein each reflective region has at least a reflective surface such that all the reflective surfaces are parallel to each other.

5. The method of claim 1, wherein each reflective region is a multi-facial conical depression.

6. The method of claim 1, wherein the substrate furthermore comprises a protective layer on the polished surface and the reflective region.

7. The method of claim 6, wherein the protective layer is fabricated using a dielectric material.

8. The method of claim 1, wherein the cylindrical lens has a light incident surface and a light-emitting surface such that the light incident surface is a plane surface and the light-emitting surface is a convex surface and that the grating pattern enters the light incident surface and emerges from the light-emitting surface of the cylindrical lens.

9. The method of claim 8, wherein the light incident surface comprises a plane rectangular surface.

10. The method of claim 1, wherein the grating pattern produces a surface acoustic wave transmission on a surface film of the substrate.

11. The method of claim 1, wherein the grating pattern on the surface of the substrate has a rectangular overall profile.

12. A method of measuring the thickness of a thin film, comprising the steps of:
   providing a substrate with a polished surface having a plurality of reflective regions thereon;
   providing a pulsed laser beam that shines on the reflective regions on the substrate to produce a grating pattern through optical interference;
   providing a cylindrical lens positioned between the substrate and the thin film such that the configuration of the grating pattern can be adjusted through a shift in lens position; and
   finding the thickness of the film indirectly through taking measurement of the surface acoustic wave produced by the laser-induced grating pattern on the film.

13. The method of claim 12, wherein the reflective regions on the substrate are formed by performing a series of imprinting operations using a Vicker's micro-hardness tester.

14. The method of claim 12, wherein the reflective regions on the substrate are formed by performing a series of semiconductor processes to shape the surface of the substrate.

15. The method of claim 12, wherein each reflective region has at least a reflective surface such that all the reflective surfaces are parallel to each other.

16. The method of claim 12, wherein each reflective region is a multi-facial conical depression.

17. The method of claim 12, wherein the substrate furthermore comprises a protective layer on the polished surface and the reflective region.

18. The method of claim 17, wherein the protective layer is fabricated using a dielectric material.

19. The method of claim 12, wherein the cylindrical lens has a light incident surface and a light-emitting surface such that the light incident surface is a plane surface and the light-emitting surface is a convex surface and that the grating pattern enters the light incident surface and emerges from the light-emitting surface of the cylindrical lens.

20. The method of claim 19, wherein the light incident surface comprises a plane rectangular surface.

21. The method of claim 12, wherein the acoustic wave propagates in a plane parallel to the surface of the film.

22. The method of claim 12, wherein the grating pattern on the surface of the substrate has a rectangular overall profile.

* * * * *